May 28, 1968 G. SCHWARZ 3,385,186
PHOTOGRAPHIC CAMERA MECHANISM
Filed June 4, 1965 2 Sheets-Sheet 1

May 28, 1968  G. SCHWARZ  3,385,186
PHOTOGRAPHIC CAMERA MECHANISM
Filed June 4, 1965  2 Sheets-Sheet 2

United States Patent Office 3,385,186
Patented May 28, 1968

3,385,186
PHOTOGRAPHIC CAMERA MECHANISM
Gerhard Schwarz, Munich, Germany, assignor to Compur-Werk Gesellschaft mit beschrankter Haftung & Co., Munich, Germany, a company of Germany
Filed June 4, 1965, Ser. No. 461,305
10 Claims. (Cl. 95—10)

ABSTRACT OF THE DISCLOSURE

A photographic camera apparatus having a gear train interconnecting the time-diaphragm setting devices and a follow-up indicator which cooperates with the exposure meter indicator. The time-diaphragm setting devices cooperate with a summing gear and cam forming grooves which convert axial displacement to rotational movement of a gear train comprising a wide toothed wheel which registers with, and slides along, an axially immovable gear so that axial movement of the wide toothed gear during focussing does not disturb the time-diaphragm settings.

---

The present invention relates to a photographic camera having an axially adjustable objective, a photoelectric exposure meter, a device for setting the exposure, a follow-up member associated with the exposure meter and a gear train for operatively interconnecting the exposure setting device and the follow-up member.

In photographic cameras it has been well known to provide a follow-up member in association with the exposure meter, the follow-up member being connected to the exposure setting device so that by matching the position of the follow-up member with the pointer of the exposure meter a correct exposure setting is obtained. However, in certain cameras the exposure setting device is mounted in the objective which is axially adjustable and thus it is necessary to interconnect the follow-up member with the exposure setting device with means which permits the objective to be axially adjusted without affecting the position of the follow-up member and which provides for accurate response of the follow-up member to adjustment of the exposure setting device.

The present invention provides such a means in the form of a gear train having an axially displaceable transmission member. This gear train permits the objective and exposure setting device to be displaced axially without movement of the follow-up member. There is provided a transmission member in engagement with the exposure setting device and the transmission member is moved axially in response to adjustment of the exposure setting device and through a toothed wheel and pinion transmits such movement to the follow-up member associated with the exposure meter. Such axial motion of the transmission member is translated into rotary movement of the toothed wheel through an inclined control cam on the transmission member engaged by an inwardly directed projection on the toothed wheel. The toothed wheel is in engagement with a pinion and the teeth on the wheel are wide in an axial direction so that the toothed wheel can move axially with respect to the pinion and remain in engagement therewith. Thus when the objective is moved axially the exposure seetting device, transmission member and toothed wheel are moved axially with respect to the axially immovable pinion.

An object of the present invention is to provide a gear train for interconnecting an exposure setting device with a follow-up member associated with an exposure meter, the gear train including a transmission member having an inclined control cam engageable with a projection on a toothed wheel, the transmission member and toothed wheel being axially displaceable relative to a pinion in engagement with the toothed wheel.

Figure 1:
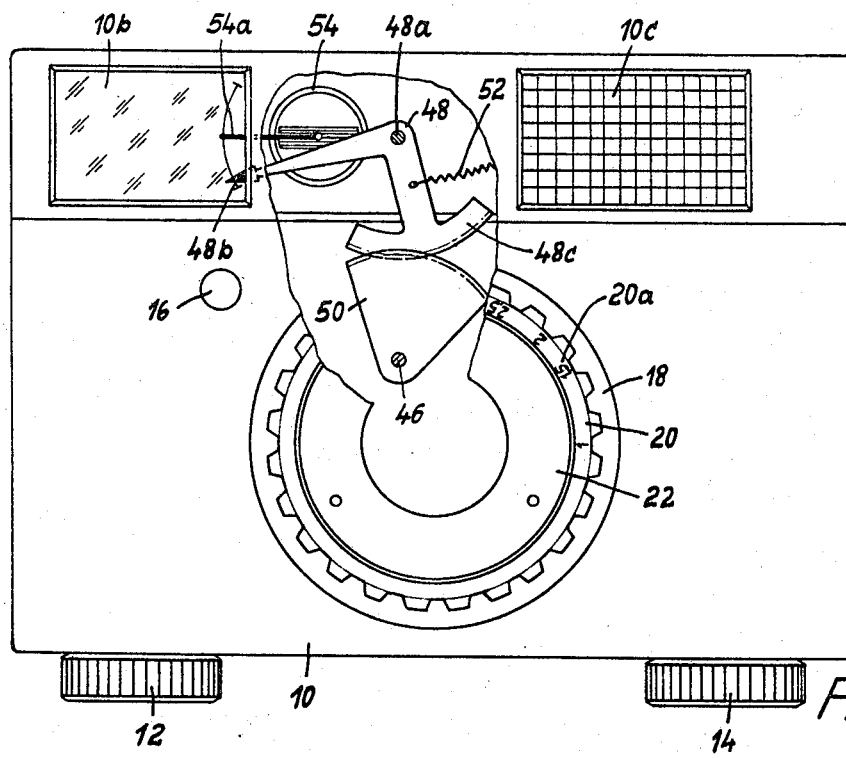
Figure 2:
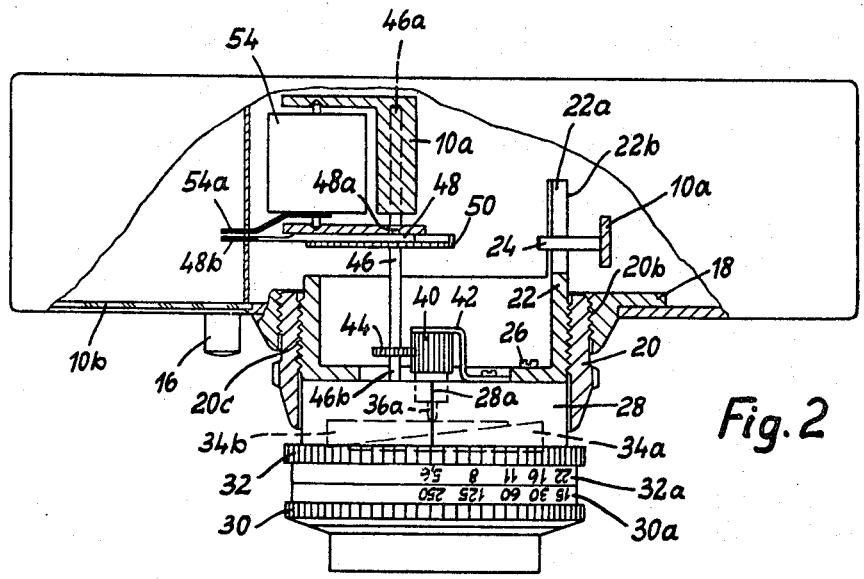
Figure 3:
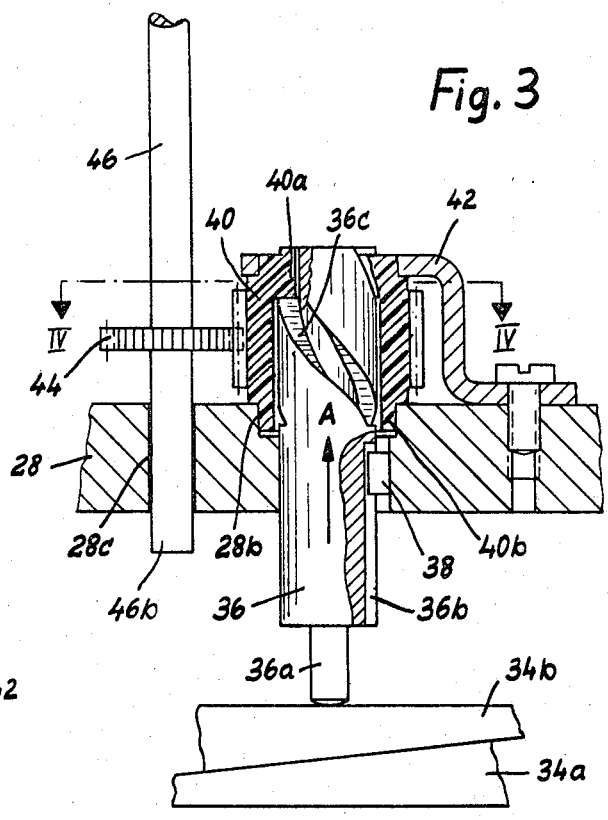
Figure 5:
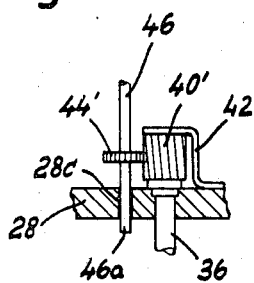
Figure 4:
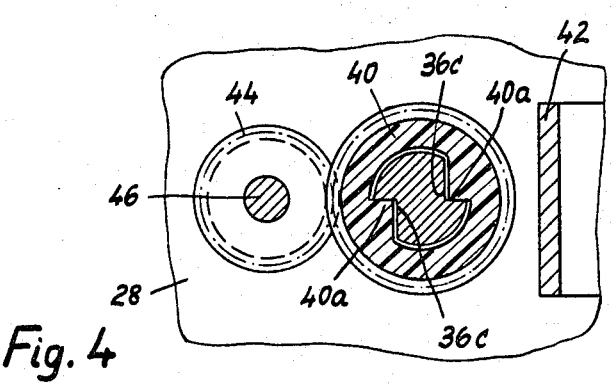

Other objects and many of the attendant advantages of the present invention will become more readily apparent upon consideration of the following detailed specification in connection with the accompanying drawings wherein:

FIGURE 1 is a front view, partly broken away, of a camera showing the exposure meter and follow-up member, FIGURE 2 shows the camera in plan view, with parts exposed and partially in cross section, FIGURE 3 is a longitudinal section of the gear train interconnecting the exposure setting device and the follow-up member shown on an enlarged scale, FIGURE 4 is a cross section on the line IV—IV of FIGURE 3, and FIGURE 5 shows a modified form of the gear train.

The photographic camera 10 is of well known construction with a film winding knob 12, a rewinding knob 14 and a trip button 16. A collar 18 is secured to the front side of the camera 10 by screws which have not been shown. A threaded ring 20 has right hand screw threads 20b on its outer surface to engage threads in the collar 18 and on the inner face ring 20 has left hand threads 20c to engage mounting holder 22. The mounting holder 22 is provided with two spaced axial projections 22b forming a slot 22a therebetween. Engaged in this slot is a guide pin 24 secured in the wall 10a of the camera. In addition the mounting holder is connected by a plurality of screws 26 to the housing of an objective shutter 28 of known type, this having a time setting ring 30 with a scale 30a and a diaphragm setting ring 32 with a scale 32a. The scales 30a, 32a are adjustable relatively to a mark 28a. In addition the threaded ring 20 has a focussing scale 20a on the enveloping surface thereof, and this also is used in conjunction with the mark 28a. The objective shutter 28 is equipped with a summing gear, for example a wedge differential 34a and 34b of the type shown, for example, in U.S. Patent No. 2,979,998. The details of the summing gear form no essential part of the present invention. One wedge 34b of this gear is in engagement with the reduced end 36a of an axially-displaceable, cylindrical pin 36, which represents a summing member for the two setting devices 30, 32. The pin 36 has a longitudinal groove 36b engaged in which is a stationary key 38 which only permits axial movement of the pin 36. In addition the pin 36 is provided with two oppositely-disposed cam forming grooves 36c with a pitch angle of approximately 45°, in each of which engages an inwardly-directed tooth 40a (FIG. 4) having appropriately shaped flanks. Teeth 40a extend inwardly from a sleeve-form toothed wheel 40, made of a synthetic plastic material. The toothed pinion 40 is rotatably mounted on the rear wall 28 of the shutter housing and for this purpose has a stepped cylindrical surface 40b which engages in a bearing orifice 28b in the shutter housing 28. In addition the pinion 40 is held against axial movement by a retaining clip 42. Engaged with the toothed wheel 40 is a pinion 44 on a shaft 46. One end 46a of the shaft 46 (FIG. 2) is mounted in the camera housing 10a and its other end 46b is disposed in a guide hole 28c in the shutter housing 28. Furthermore a double-armed follow-up indicator 48 is rotatably mounted on the pin 48a in the camera housing 10a and this has a pointer 48b and a toothed segment 48c in which engages a toothed segment 50 mounted on the shaft 46. Associated with the follow-up indicator 48 is a return spring 52 which urges the end 36a of pin 36 into engagement with the wedge 34b.

Secured in the camera 10 is the housing of a photoelectric exposure meter 54 the measurement indicator 54a of which cooperates with the mark 48b of the follow-up indicator 48. The exposure meter indicator 54a and the pointer 48b are visible in an observation window 10b of the camera 10. Moreover a photocell, which is conductively connected to the winding of the exposure meter in a manner not illustrated, is located behind a gridded window 10c of the camera 10.

The setting assembly described above is used as follows:

If a photograph is to be taken it is first necessary to perform the various setting operations. Amongst these are the setting of an exposure value, or a corresponding time-diaphragm pairing, in accordance with the data given by the exposure meter. The setting of the exposure value is implemented by adjusting the time setting device 30, or the diaphragm setting device 32 in one direction or the other. It is assumed that, in the performance of these operations, the summing member 36 is moved axially in the direction of the arrow A (FIG. 3) through the summing gear 34a, 34b. As soon as there is any axial movement of the summing member relative to the toothed wheel 40, this axial movement is converted by the control cams 36c and projections 40a into rotary movement of the toothed wheel 40 and transmitted to the toothed pinion 44. The shaft 46 and the toothed segment 50 are thereby turned, for example in the counter-clockwise direction, and the follow-up indicator 48 is brought into register with the indicator 54a. After setting the exposure value in this way, it is possible, if desired, to make a selection of the required time and diaphragm pairing at a set, constant exposure value, and this by simultaneous turning of the two rings 30 and 32 in the same direction. The time-diaphragm mechanisms are so devised that the shutter period is, for example, shortened by the same factor that the diaphragm aperture is increased, or vice versa.

In addition, for the purpose of focussing, the scale 20a of the ring 20 may need to be set to the corresponding focus or distance value, for example to three meters, in reference to the mark 28a. During this movement of the threaded ring 20 in the counter clockwise direction the mounting holder 22 merely moves axially, for example forwardly. The objective shutter 28, the pin 36 and the toothed wheel 40 also participate in this movement of the mounting holder 22. In this respect the wide toothed wheel 40 merely slides along the axially-immovable toothed pinion 44, and there is no rotational movement of the members 36, 40 or 44. Consequently the previously-set exposure value, or the time-diaphragm pairing, is not affected during the shifting of the component parts carried by the mounting 22, during the focussing.

FIGURE 5 illustrates a somewhat modified method of constructing the toothed wheel which is in operative connection with the summing member 36. Thus parts which also appear in FIGURES 1 to 4 have here been given the same reference numerals. In contrast to the first example, in which the teeth of the toothed wheel 40 and of the pinion 44 are parallel to the optical axis, in the present case the toothed wheel 40' and the pinion 44' have external teeth which extend obliquely with respect to the optical axis. This provides for a correction of the exposure meter indication in accordance with the projection of the objective.

The arrangement according to the invention, that is, the use of a conversion gear having control cams and projections, in the gear train between the setting device at the objective shutter and the exposure meter in the camera has the advantage that the transmission of motion during the setting of the exposure value, and also during the focussing, takes place between movable and stationary members at one single place, namely at the external teeth of the wheel 40. This allows for the use of a gear train of only a few elements and a simple compact construction of the setting assembly.

I claim:

1. In a photographic camera, an objective lens, a photoelectric exposure meter, means associated with the objective lens for setting the exposure time and diaphragm opening setting, holder means mounting said last named means, a follow up indicator associated with the exposure meter, means operatively interconnecting the exposure time and diaphragm opening means with the follow up indicator, said last named means including, an axially movable pin mounted on said holder means, an inclined control cam on said pin, a toothed wheel surrounding said pin and rotatably mounted thereon, an inwardly directed projection on said toothed wheel engageable with the control cam, and gear means coupling the toothed wheel and the follow up indicator, and means mounting the holder means for axial movement whereby during axial movement of the holder means the toothed wheel is displaced relative to said gear means.

2. In a photographic camera according to claim 1 wherein the toothed wheel has wide rectilinear outer teeth.

3. In a photographic camera according to claim 1 wherein the toothed wheel has wide outer teeth inclined with respect to the optical axis.

4. In a photographic camera, a housing, a photoelectric exposure meter in said housing, a holder on said housing, means mounting said holder for axial movement with respect to the housing, an objective lens on said holder, means for setting the exposure time and diaphragm opening on said holder, an axially movable pin on said holder, means responsive to the exposure time and diaphragm opening engageable with a pin, a toothed wheel surrounding the pin and rotatable thereon, inclined cam and follower means on said pin and wheel whereby axial movement of the pin causes rotation of the wheel, pinion means engageable with the wheel, and a follow up indicator connected to said pinion means, said toothed wheel having relatively wide teeth so that axial movement of the holder to focus the camera causes displacement of the wheel with respect to the pinion along the wide teeth of the wheel so that movement of the follow up indicator is caused by adjustment of the exposure time and diaphragm opening and not by focusing of the camera.

5. In a photographic camera comprising a camera housing, a photoelectric exposure meter in said housing, said meter having an indicator, a follow up indicator associated with the exposure meter indicator, a threaded ring rotatable in said housing, a mounting holder screw threaded in the threaded ring, pin and slot means operatively associated with the mounting holder restraining the holder from rotation, means for axially moving the mounting holder for focussing the camera, an objective shutter housing mounted on said mounting holder, means on said objective shutter housing for setting the exposure time and diaphragm opening, summing gear means responsive to the exposure time and diaphragm opening setting, an axially movable pin mounted in said mounting holder engageable with said summing gear means, a cam forming groove in said pin, a toothed wheel rotatable on said pin, follower means on said toothed wheel engageable in the cam groove in the pin whereby axial movement of the pin causes rotation of the wheel, pinion means engageable with the teeth on the wheel and means interconnecting the pinion means and follow up indicator whereby adjustment of the exposure time and diaphragm opening causes axial movement of the pin and movement of the follow up indicator and focussing of the camera causes axial movement of the toothed wheel with respect to the pinion means.

6. In a photographic camera according to claim 5 wherein said last named means includes a shaft mounting said pinion means, a toothed segment on said shaft, said toothed segment being engaged with the follow up indicator.

7. In a photographic camera according to claim 5 and further including spring means urging said pin into engagement with said summing gear means.

8. In a photographic camera according to claim 5 wherein said toothed wheel has wide rectilinear outer teeth.

9. In a photographic camera according to claim 5 wherein said toothed wheel has wide outer teeth inclined with respect to the optical axis of the camera.

10. In a photographic camera, a housing, a photoelectric exposure meter in said housing, a holder on said housing, means mounting said holder for axial movement with respect to the housing, an objective lens on said holder, at least one setting means rotatably mounted on said holder for setting the exposure value, an axially movable transmitting member on said holder, means responsive to the setting means and engageable with said transmitting member, a toothed wheel surrounding said transmitting member, at least one control cam on said transmitting member and said wheel whereby axial movement of the transmitting member causes rotation of the wheel, pinion means engageable with the wheel, and a follow up indicator connected to said pinion means and cooperating with said exposure meter, said toothed wheel having relatively wide teeth so that axial movement of the holder during the focussing of said lens causes only axial displacement of the wheel with respect to the pinion along the wide teeth of the wheel, so that movement of the follow up indicator is only caused by rotating movement of said setting means and not during the axial movement of said holder for the purpose of focussing of the objective lens.

References Cited
UNITED STATES PATENTS

| | | | |
|---|---|---|---|
| 2,999,437 | 9/1961 | Hahn et al. | 95—10 |
| 3,126,802 | 3/1964 | Jakob et al. | 95—10 |
| 3,270,640 | 9/1966 | Hofmann et al. | 95—10 |
| 3,332,329 | 7/1967 | Singer | 95—100 |

NORTON ANSHER, *Primary Examiner.*

J. F. PETERS, *Assistant Examiner.*